United States Patent [19]

Tsunashima et al.

[11] Patent Number: 5,271,985
[45] Date of Patent: Dec. 21, 1993

[54] POLYESTER FILM HAVING SPECIFIC SURFACE PROPERTIES

[75] Inventors: Kenji Tsunashima, Kyoto; Seizo Aoki, Koka; Masaru Suzuki, Itoh; Toshihiko Hiraoka, Otsu, all of Japan

[73] Assignee: Toray Industries, Inc., Japan

[21] Appl. No.: 741,187

[22] Filed: Jul. 30, 1991

Related U.S. Application Data

[63] Continuation of Ser. No. 350,621, Apr. 25, 1989, abandoned.

[30] Foreign Application Priority Data

Aug. 28, 1987 [JP] Japan .................. 62-215732
Nov. 10, 1987 [JP] Japan .................. 62-283391

[51] Int. Cl.$^5$ .............................. B32B 9/00
[52] U.S. Cl. ............................ 428/141; 428/64; 428/65; 428/409; 428/480; 428/913; 430/945
[58] Field of Search ............... 428/409, 480, 64, 65, 428/913, 141; 430/945; 528/272, 305, 308.1

[56] References Cited

U.S. PATENT DOCUMENTS

| | | | |
|---|---|---|---|
| 4,719,171 | 1/1988 | Ikenaga et al. | 430/271 |
| 4,899,168 | 2/1990 | Osato et al. | 430/945 |
| 4,965,307 | 10/1990 | Okabe et al. | 524/425 |
| 5,047,278 | 9/1991 | Ono et al. | 428/141 |

FOREIGN PATENT DOCUMENTS

| | | |
|---|---|---|
| 0227043 | 7/1987 | European Pat. Off. . |
| 62-247807 | 10/1987 | Japan . |
| 0252513 | 1/1988 | Japan . |
| 3081022 | 4/1988 | Japan . |

*Primary Examiner*—Paul J. Thibodeau
*Assistant Examiner*—Hoa T. Le
*Attorney, Agent, or Firm*—Austin R. Miller

[57] ABSTRACT

This invention relates to a polyester film suited for use in optical recording medium. The polyester film of the present invention has a modulus of photoelasticity of not more than $0.9 \times 10^{-3}$ mm$^2$/kgf, a maximum surface roughness Rt of not more than 100 nm and a mean interval Sm between adjacent surface projections of not less than 20 μm, so that light scattering and interference are not caused, and optical strain is not generated even when a thermal stress or external force is exerted to the film. Thus, the polyester film of the present invention can be used as the supporting layer or cover layer of optical recording media such as optical cards, optical disks and optical recording tapes.

7 Claims, No Drawings

POLYESTER FILM HAVING SPECIFIC SURFACE PROPERTIES

This application is a continuation of application Ser. No. 07/350,621, filed Apr. 25, 1989, now abandoned.

TECHNICAL FIELD

This invention relates to a polyester film. More particularly, this invention relates to a polyester film which has excellent mechanical properties and optical properties.

BACKGROUND ART

As the support layer of optical recording media, polymethylmethacrylate films and polycarbonate films have been conventionally employed (U.S. Pat. No. 4,614,634). Although the polymethylmethacrylate films have excellent optical characteristics, they have poor dimensional stability against the change in temperature and have poor moldability. Although the polycarbonate films are unlikely to be influenced by humidity and have good moldability, they have a drawback in that optical strain is likely to be generated.

To solve these problems, it has been proposed to employ a polyester film as the support layer (Japanese Patent Disclosure (Kokai) No. 208645/82). As the polyester film, films of polyethyleneterephthalate and its derivatives are known.

However, when a polyester film is used as the support layer or a cover layer of the optical recording media, optical strain is easily generated due to thermal stress or external force.

That is, if an external force causing bending, stretching or compression of a medium is exerted to the medium known the mechanical deformation thereof when the recording media is used, optical strain is formed thereby. When the recording medium is rotated at a high speed as in the case of an optical disk, similar deformation is usually caused by the centrifugal force. Such a deformation causes optical strain or double refraction. This phenomenon is known as photoelasticity. Since polarized laser beams are used for reading the recorded signals, photoelasticity is a major cause of reading error.

Further, if the heat resistance of the film is low, the medium may be deformed by the heat added during the processing of the recording medium or during the writing or reading of the signals. Such deformation may result in scattering or increased photoelasticity. As a result, the writing may not be conducted completely or reading error may be caused.

Further, if the surface of the film is rough, light is scattered and interfered such that the intensity of the recorded signal is significantly decreased.

DISCLOSURE OF THE INVENTION

The object of the present invention is to overcome the problems inherent in the conventional technique and to provide a polyester film with which the rate of reading error due to scattering or interference of light is low, and which is not deformed easily by thermal stress or external force so that optical strain is hardly generated.

The present invention provides a polyester film which has a modulus of photoelasticity of not more than $0.9 \times 10^{-3}$ mm$^2$/kgf, a maximum surface roughness Rt of not more than 100 nm, and a mean interval Sm between adjacent surface projections of not less than 20 μm. The present invention further provides a polyester film which is prepared by reacting a bifunctional carboxylic acid and/or an ester-forming derivative thereof, which contains not less than 10 mol % of a diphenyldicarboxylic acid and/or a derivative thereof with a dihydroxy compound and/or an ester-forming derivative thereof.

In this specification, unless otherwise specified, the term "film" includes products which are thick and usually called "sheet".

The polyester film of the present invention can inhibit photoelasticity and has specific surface conditions, so that it can prevent the reading errors of recorded signals.

Further, the polyester film of the present invention is stable against environment of conditions such as heat, solvents, external forces, as well as humidity and light, so that an optical medium with high reliability may be attained.

BEST MODE FOR CARRYING OUT THE INVENTION

The diphenyldicarboxylic acid or a derivative thereof herein means the compounds which have one carboxyl group on a phenyl group. Among the compounds, preferred are those in which the position of the carboxyl groups are asymmetric such as 2,2', and 2,3'. Needless to say, the compounds may be those having on the benzene ring a functional group such as an alkyl group of lower polarity. If the position of the carboxyl groups is not symmetrical, it is easy for the main chain of the copolymerized polyester to take a bent structure, so that the amorphousness and optical characteristics of the film may be improved. When using a dicarboxylic acid such as diphenyl-4,4'-dicarboxylic acid in which the position of the carboxyl groups are symmetrical, the molecules are likely to be oriented, and it is advisable to use such a dicarboxylic acid in the form of a derivative having a side chain with high polarity or a dicarboxylic acid in the form of an ester-forming derivative.

The content of the diphenyldicarboxylic acid is not less than 10 mol %, preferably 15–70 mol % and more preferably 20–50 mol %. If the content is less than 10 mol %, the effect by the diphenyldicarboxylic acid is not shown, and if the content exceeds 70 mol %, the film is brittle so that the processability of the film is degraded. Examples of the derivatives of the diphenyldicarboxylic acid may include diphenyl ether dicarboxylic acid, diphenylsulfonedicarboxylic acid, diphenyl thioether dicarboxylic acid, diphenyl ketone dicarboxylic acid and diphenylethanedicarboxylic acid.

Examples of the acid component other than the diphenyldicarboxylic acid may include terephthalic acid, isophthalic acid, phthalic acid, naphthalenedicarboxylic acid, diphenoxyethanedicarboxylic acid, cyclohexanedicarboxylic acid, succinic acid, azipic acid, sebacic acid, stilbenedicarboxylic acid, 1,1,3-trimethyl-3-phenylindane-4',5-dicarboxylic acid, as well as oxycarboxylic acids such as p-oxybenzoic acid. Among these, terephthalic acid, isophthalic acid, cyclohexanedicarboxylic acid, sebacic acid, 1,1,3-trimethyl-3-phenylindane-4',5-dicarboxylic acid are especially preferred in the present invention.

Examples of the dihydroxy compound may include ethylene glycol, trimethylene glycol, tetramethylene glycol, cyclohexane dimethanol, 2,2-bis(4-hydroxydiphenyl)propane, 2,2-bis(4-hydroxyethoxyphenyl)propane, bis(4-hydroxyphenyl)sulfone, polyethylene glycol, polytetramethylene glycol, diethylene glycol, neopentyl glycol, hydroquinone and cyclohexanediol. Among these, cyclohexane dimethanol, ethylene glycol and tetramethylene glycol are especially preferred in the present invention.

In the polyester, a polyfunctional compound with tri- or more functional groups such as trimellitic acid, trimesic acid, pyromellitic acid, glycerine and pentaerythritol may be copolymerized as long as the polymer retains a substantially linear form. Further, as long as the polymer retains a substantially linear form, a polymer with a molecular weight of 300-70,000, such as polyacrylate, polyacrylamide, polyacrylonitrile, polystyrene, polysiloxane, polymethylmethacrylate, polybutylacrylate and derivatives thereof may be graft-copolymerized as a side chain with the polyester main chain.

By attaching a side chain to the polyester main chain, the difference between the polarizability in the direction of the axis of the polyester molecule chain and in the direction perpendicular thereto is reduced. Thereby the intrinsic double refraction of the polymer is lowered, and optical strain is hardly generated. The side chain may be attached by, for example, employing a so-called macromonomer which is a macromolecular monomer having a dihydroxyl group or dicarboxyl group as a polymerizable functional group at its end. The structure of the macromonomer may be represented by the following formulae:

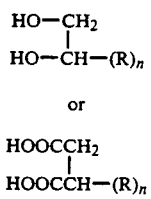

Here, R may be styrene, styreneacrylonitrile, methylmethacrylate, butylacrylate or the like. The macromonomer preferably has a molecular weight of 300-6000. By copolymerizing the macromonomer with the dicarboxylic acid and the dihydroxy compound, the side chain may easily be formed.

In the present invention, especially preferred polyesters are those having, as the dicarboxylic acid, dipheynl-2,2'-dicarboxylic acid (diphenic acid), terephthalic acid, isophthalic acid, sebacic acid or 1,1,3-trimethyl-3-phenylindane-4',5-dicarboxylic acid, and having, as the dihydroxy compound, cyclohexane-dimethanol, ethylene glycol or tetramethylene glycol.

The modulus of photoelasticity of the polyester is not more than $0.9 \times 10^{-3}$ mm$^2$/kgf, preferably not more than $0.7 \times 10^{-3}$ mm$^2$/kgf, and more preferably not more than $0.4 \times 10^{-3}$ mm$^2$/kgf.

If the modulus of photoelasticity is more than $0.9 \times 10^{-3}$ mm$^2$/kgf, the optical strain or double refraction due to mechanical deformation of the film caused by external forces such as bending, stretching and compression is enhanced. This mechanical deformation is the major cause of reading error.

The maximum surface roughness Rt of the polyester film is not more than 100 nm, preferably not more than 30 nm. The interval Sm between the adjacent peaks is not less than 20 $\mu$m, preferably not less than 100 $\mu$m. If these requirements are not met, light may be scattered or interefered and its intensity lowered, thereby causing reading error.

The polyester film of the present invention preferably has a limiting double refraction $\Delta n_0$ of not more than 0.10, more preferably not more than 0.07, still more preferably not more than 0.05. If the $\Delta n_0$ is more than 0.10, the optical anisotropy due to the slight orientation of the molecule chains is enlarged.

The relative viscosity $\eta r$ of the polyester film of the present invention may preferably be 14-70, more preferably 20-60 in view of mechanical strength and film-forming properties.

In view of the thermal deformation and mechanical strength of the film, the polyester film of the present invention preferably has a glass transition point Tg of not lower than 80° C., more preferably not lower than 85° C., still more preferably not lower than 90° C.

Although the thickness of the polyester film of the present invention is not limited, the thickness of a stretched sheet may preferably be 6-360 $\mu$m, and that of a non-stretched sheet may preferably be 250-2000 $\mu$m.

A process of manufacturing the polyester film of the present invention will now be described. It should be noted, however, the process is not limited thereto.

The dicarboxylic acid or an ester derivative thereof and a dihydroxy compound are mixed to react in accordance with the conventional process to obtain a polyester composition which has an ester bond on the main chain and which preferably has a relative viscosity $\eta r$ of 14-70.

In cases where ester interchange is required, an ester interchanging catalyst is employed other than the polymerization catalyst. Needless to say, an anti-coloring agent, antioxidant, thermal stabilizer, crystal nucleating agent, lubricant, anti-blocking agent, viscosity-adjusting agent, defoaming agent, transparentizing agent and the like may be added.

The polyester containing the diphenyldicarboxylic acid as the major component which is obtained as above and which has a modulus of photoelasticity of not more than $0.9 \times 10^{-3}$ mm$^2$/kgf is melt-extruded and cast by the conventional method. In cases where the cast film is used as an optical recording medium, the surface of the film should be smooth so as to attain a maximum roughness Rt of, for example, not more than 100 nm. Therefore, it is preferred to cool the film in the melted state between casting drum and a quenching roll or between a casting drum and an endless belt while pressing the film. In this case, the surface of the quenching roll integrally provided with the casting drum, or the surface of the endless belt made of a metal must be smooth. That is, the surface of the cooling body is required to be as smooth as not more than 0.1 S (as defined in Japanese Industrial Standard, Definitions and Designations of Surface Roughness). By employing sufficiently cooled surfaces of the cooling bodies both surfaces of the film are rapidly cooled to prevent crystallization, so that a film with excellent transparency and smoothness may be obtained.

Alternatively the film is cast onto a drum with a surface roughness of not more than 0.1 S and the surface of the film not contacting the drum is pressed with a roll with a temperature higher than the glass transition point of the film and then rapidly cooled with a quenching roll.

Alternatively, the extruded polymer in the melted state may also be held as a bank between a pair of rolls having smooth surfaces and then extruded therefrom to conduct calendering.

Alternatively, the extruded film in the melted state is cast onto a smooth metal endless belt and then heated, pressed and rapidly cooled between the endless belt and another smooth metal endless belt.

The thus obtained film with an Rt value of not more than 100 nm and an Sm value of not less than 20 μm may preferably be laminated with an olefin polymer film such as polypropylene, ethylene/propylene copolymer, polymethylpentene and ethylene/vinyl acetate copolymer, or an anti-scratching layer may preferably be coated thereon, in order to prevent scratching of the surface of the film.

The cast film may then be oriented or heat set if necessary.

The method of evaluation of the characteristics concerning the present invention will now be described.

(1) Glass Transition Point

Ten milligrams of the polyester film is set in a scanning calorimeter and the temperature of the film is raised at a rate of 20° C./min under nitrogen flow. The glass transition point is defined as the mean temperature at which the base line starts to deviate and the temperature at which the curve returns to a new base line. In some cases, the base line does not deviate but an endothermic peak emerges. In that case, the peak temperature is defined as the glass transition point.

(2) Relative Viscosity $\eta r$

After cooling the polyester with dry ice, the polyester is pulverized to a size of not greater than 100 mesh with a mill. In 100 ml of hot o-chlorophenol with a temperature of 150° C., 8 g of the pulverized polyester is placed to dissolve the same in 1–2 minutes. The viscosity $\eta$ of this polymer solution and the viscosity $\eta_0$ of o-chlorophenol are measured at 25° C. and the ratio thereof is defined as the relative viscosity.

$$\eta_r = \eta/\eta_0$$

(3) Modulus of Photoelasticity

The change in the double refraction $\Delta n$ when a load of 1 kg is applied to a sample with a width of 10 mm is measured and the modulus of photoelasticity is defined as $\Delta n/S$ wherein S is the stress exerted to the sample. In this measurement, the change in the thickness of the film when the film is subjected to elastic micro deformation can be ignored.

The double refraction in the plane of the film is measured by setting the sample film in a polarizing microscope with a crossed nicol, of which light source is sodium D line (589 nm), such that the plane of the sample film is perpendicular to the light axis, and by determining the difference in the optical path $\Gamma$ from the compensation value of a compensator. The double refraction is defined as $\Gamma/d$ wherein d is the thickness of the sample film.

(4) Rate of Reading Error

Aluminum is vapor-deposited on one surface of the polyester film and a laser beam is impinged perpendicularly on the non-deposited surface of the polyester film. The laser beam is a linearly polarized semiconductor laser beam with an oscillating wavelength of 780–820 nm. After passing through a beam slitter prism, the laser beam passes through a quarter-wave plate to become a circularly polarized light, and the circularly polarized light perpendicularly impinges on the polyester film. The reflected light again passes through the quarter-wave plate to become a linearly polarized light which re-impinges on the beam slitter prism. Only the linearly polarized light of the inpinging light passes through the beam slitter prism and the re-inpinging light which has a polarized wave plane deviated by 90 degrees from that of the inpinging light is reflected. The reflected light reaches an optical signal detector and the intensity thereof is measured. The rate of reading error is defined as $(I_0 - I)/I$ wherein $I_0$ is the intensity of the reflected light detected when the laser beam impinges on a flat film and I is the intensity of the reflected light detected when the laser beam impinges on a film bent to have a radius of curvature of 100 mm.

(5) Limiting Double Refraction Value

Limiting double refraction value is the anisotropy of the index of refraction due to the theoretical maximum uniaxial orientation of a polymer. In the present invention, the limiting double refraction value is measured by a simplified method in which monofilaments with a diameter of 250 μm are stretched under various temperatures. The and the limiting double refraction value is defined as the maximum double refraction value at the extrapolated stretching ratio at which the monofilament is broken.

(6) Maximum Surface Roughness Rt and Mean Interval between Adjacent Peaks

The maximum surface roughness Rt and the mean interval Sm between adjacent peaks were measured using a high precision thin film level difference-measuring apparatus manufactured by Kosaka Kenkyusho (model #ET-10). The Rt is defined as the distance between the highest peak and the deepest valley of the roughness curve, and the Sm is defined as the average distance between a peak and a valley of the roughness curve which intersects the center line. The measuring conditions are as follows and the average of 20 measurements is shown.

Radius of Touching Pin: 0.5 μm
Load of Touching Pin: 5 mg
Measurement Length: 1 mm
Cutoff Value: 0.08 mm The details of the definition of the parameters are described in, for example, Jiro Nara, "Method of Measuring and Evaluating Surface Roughness" (Sogo Gijutsu Center, 1983).

The invention will now be described in detail by way of examples thereof. However, the present invention is not limited to the examples.

EXAMPLE 1

A polyester having as the dicarboxylic acid component terephthalic acid (80 mol %) and diphenyl-2,2'-dicarboxylic acid (20 mol %) and having as the dihydroxy component 1,4-cyclohexanedimethanol was heated to 290°, and was cast to a mirror-finished drum from a T-die in accordance with the conventional method to obtain a non-oriented film with a thickness of 400 μm.

EXAMPLE 2

A polyester having as the dicarboxylic acid terephthalic acid (50 mol %) and diphenyl-2,2'-dicarboxylic acid (50 mol %) and having as the dihydroxy component 1,4-cyclohexanedimethanol was cast in the same manner as in Example 1 to obtain a non-oriented film with a thickness of 400 μm.

COMPARATIVE EXAMPLE 1

A polyester having as the dicarboxylic acid terephthalic acid (95 mol %) and diphenyl-2,2'-dicarboxylic acid (5 mol %) and having as the dihydroxy component 1,4-cyclohexanedimethanol was cast in the same manner as in Example 1 to obtain a non-oriented film with a thickness of 400 μm.

COMPARATIVE EXAMPLE 2

A non-oriented film with a thickness of 400 um was obtained as in Example 1 except that 0.15 wt % of $SiO_2$ with an average particle size of 30 nm was added. The characteristics of the films of Examples 1 and 2 and Comparative Example 1 were evaluated to obtain the results shown in Table 1.

TABLE 1

| Evaluated Items | Example 1 | Example 2 | Comparative Example 1 | Comparative Example 2 |
|---|---|---|---|---|
| Glass Transition Point Tg (°C.) | 85 | 88 | 81 | 85 |
| Relative Viscosity ($\eta r$) | 20 | 20 | 16 | 20 |
| Limiting Double Refraction | 0.09 | 0.05 | 0.17 | 0.09 |
| Photoelasticity (mm$^2$/kgf) | $0.7 \times 10^{-3}$ | $0.4 \times 10^{-3}$ | $1.7 \times 10^{-3}$ | $0.7 \times 10^{-3}$ |
| Rate of Reading Error | 0.054 | 0.002 | 0.42 | 0.58 |
| Maximum Roughness Rt (nm) | 3 | 5 | 10 | 18 |
| Peak Inteval Sm (μm) | 100 | 250 | 70 | 2 |

EXAMPLE 3

A polyester having as the dicarboxylic acid component terephthalic acid (70 mol %) and diphenyl ether-2,2'-dicarboxylic acid (30 mol %) and having as the dihydroxy component 1,4-cyclohexanedimethanol (90 mol %) and ethylene glycol (10 mol %), which polyester has a relative viscosity of 22, was cast in the same manner as in Example 3 to obtain a non-oriented film with a thickness of 400 um.

TABLE 2

| Evaluated Items | Example 3 |
|---|---|
| Glass Transition Point Tg (°C.) | 85 |
| Relative Viscosity $\eta_r$ | 22 |
| Limiting Double Refraction Value | 0.08 |
| Photoelasticity (mm$^2$/kgf) | $0.9 \times 10^{-3}$ |
| Rate of Reading Error | 0.04 |
| Rt (nm) | 8 |
| Sm (μm) | 350 |

COMPARATIVE EXAMPLE 3

A polyester having as the dicarboxylic acid component terephthalic acid (85 mol %) and isophthalic acid (15 mol %) and having as the dihydroxy component 1,4-cyclohexanedimethanol, which polyester has a relative viscosity of 22, was cast in the same manner as in Example 3 to obtain a non-oriented film with a thickness of 400 μm.

The characteristics of the film obtained in Comparative Example 3 were evaluated. As shown in Table 3, the photoelasticity of the film is so large that it cannot be used as a cover film for an optical recording medium.

TABLE 3

| Evaluated Items | Comparative Example 3 |
|---|---|
| Glass Transition Point Tg (°C.) | 85 |
| Relative Viscosity $\eta_r$ | 18 |
| Limiting Double Refraction Value | 0.21 |
| Photoelasticity (mm$^2$/kgf) | $1.6 \times 10^{-3}$ |
| Rate of Reading Error | 0.45 |
| Rt (nm) | 25 |
| Sm (μm) | 100 |

INDUSTRIAL APPLICABILITY

The polyester film of the present invention does not have optical strain even if a thermal stress or external force is exerted thereto because the photoelasticity thereof is small. Further, since the polyester film of the present invention has specific surface conditions, the scattering of light and interference are small. Therefore, the film of the present invention is suitable for the support layer of optical recording media such as optical cards and optical recording tapes.

We claim:

1. A polyester film for use as a support layer for optical recording media comprising a polyester as a major component, characterized in that the polyester film has a modulus of photoelasticity of not more than $0.9 \times 10^{-3}$ mm$^2$/kgf, a maximum surface roughness Rt of not more than 100 nm and a mean interval Sm between adjacent projections in the surface of the film of not less than 20 μm.

2. The polyester film of claim 1, wherein the polyester is prepared by reacting a bifunctional carboxylic acid and/or an ester-forming derivative thereof, which contains not less than 10 mol % of, a diphenyldicarboxylic acid and/or a derivative thereof with a dihydroxy compound and/or an ester-forming derivative thereof.

3. The polyester film of claim 2, wherein the diphenyldicarboxylic acid or the derivative thereof is at least one member selected from the group consisting of diphenyl-2,2'-dicarboxylic acid and derivatives thereof and, diphenyl-2,3'-dicarboxylic acid and derivatives thereof.

4. The polyester film of claim 2 or 3, wherein the derivative of the diphenyldicarboxylic acid is at least one member selected from the group consisting of diphenyl ether dicarboxylic acid, diphenylsulfonedicarboxylic acid, diphenyl thioether dicarboxylic acid, diphenyl ketone dicarboxlic acid and diphenylethanedicarboxylic acid.

5. The polyester film of claim 1, wherein the glass transition point Tg of the polyester film is not lower than 80° C.

6. An optical recording medium comprising the polyester film of any one of claims 1-3.

7. An optical recording medium comprising the polyester film of claim 5.

* * * * *

UNITED STATES PATENT AND TRADEMARK OFFICE
CERTIFICATE OF CORRECTION

PATENT NO. : 5,271,985
DATED : December 21, 1993
INVENTOR(S) : Kenji Tsunashima et al It is certified that error appears in the above-indentified patent and that said Letters Patent is hereby corrected as shown below:

In Column 1, Line 36, delete "known" and substitute --causing--.

In Column 3, Line 48, delete "dipheynl-" and substitute --diphenyl- --.

In Column 4, Line 6, delete "$\Delta n0$" and substitute --$\Delta n_o$--.

Signed and Sealed this

Twenty-sixth Day of April, 1994

Attest:

BRUCE LEHMAN

Attesting Officer     Commissioner of Patents and Trademarks